(12) United States Patent
Hisada et al.

(10) Patent No.: US 11,155,304 B2
(45) Date of Patent: *Oct. 26, 2021

(54) UTILITY VEHICLE

(71) Applicant: KAWASAKI JUKOGYO KABUSHIKI KAISHA, Hyogo (JP)

(72) Inventors: Kazumasa Hisada, Akashi (JP); Gary Bozych, Lake Forest, CA (US); Nobuyuki Nishiguchi, Irvine, CA (US); Takeru Ohshima, Irvine, CA (US); Yusuke Nakashima, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 251 days.

This patent is subject to a terminal disclaimer.

(21) Appl. No.: 15/266,559

(22) Filed: Sep. 15, 2016

(65) Prior Publication Data

US 2018/0072349 A1    Mar. 15, 2018

(51) Int. Cl.
*B62D 21/18* (2006.01)
*B62D 23/00* (2006.01)
*B62D 21/02* (2006.01)

(52) U.S. Cl.
CPC .......... *B62D 21/183* (2013.01); *B62D 21/02* (2013.01); *B62D 23/005* (2013.01)

(58) Field of Classification Search
CPC .... B62D 21/11; B62D 21/183; B62D 23/005; B62D 21/02; B60K 17/354; B60K 17/348; B60Y 2200/124
See application file for complete search history.

(56) References Cited

U.S. PATENT DOCUMENTS

| 4,045,075 | A | * | 8/1977 | Pulver | B62D 21/08 |
| | | | | | 280/798 |
| 4,799,708 | A | * | 1/1989 | Handa | B62D 21/183 |
| | | | | | 280/124.136 |
| D579,029 | S | * | 10/2008 | Harsh | D15/33 |
| 8,944,492 | B2 | * | 2/2015 | Hufnagl | B62D 21/183 |
| | | | | | 296/190.01 |
| 9,499,044 | B2 | * | 11/2016 | Osaki | B62D 21/183 |
| 9,944,327 | B2 | * | 4/2018 | Hisada | B60K 17/348 |
| 2014/0103627 | A1 | | 4/2014 | Deckard et al. | |
| 2016/0031492 | A1 | * | 2/2016 | Suzuki | B62D 23/005 |
| | | | | | 280/788 |

* cited by examiner

*Primary Examiner* — Paul N Dickson
*Assistant Examiner* — Timothy Wilhelm
(74) *Attorney, Agent, or Firm* — Wenderoth, Lind & Ponack, L.L.P.

(57) ABSTRACT

A utility vehicle includes a vehicle body frame, a pair of right and left front wheels disposed at a front end of the vehicle body frame, and a pair of right and left rear wheels disposed at a rear end of the vehicle body frame. The vehicle body frame has, at a bottom thereof, a bottom main frame extending in an anteroposterior direction at a center in a vehicle width direction, and a pair of right and left bottom side frames located width direction extending in the anteroposterior direction between the front wheels and the rear wheels at outer ends in the vehicle, and the bottom side frames are located above the bottom main frame.

18 Claims, 7 Drawing Sheets

UTILITY VEHICLE

BACKGROUND OF THE INVENTION

Field of the Invention

The present invention relates to a utility vehicle.

Description of the Related Art

There has been known a utility vehicle having improved traveling performance on an uneven ground. Such a utility vehicle has a vehicle body bottom located at a higher ground level so as to inhibit contact with or catch of an obstacle on a road surface (e.g. US 2014/0103627 A). In general, a vehicle body bottom extends horizontally in the anteroposterior direction and the vehicle width direction between front wheels and rear wheels which corresponds to a riding space.

SUMMARY OF THE INVENTION

When the utility vehicle travels on an uneven ground, the front wheels and the rear wheels, which are configured to be vertically swingable, run over an obstacle (e.g. a large rock) on a road surface whereas the vehicle body bottom occasionally contacts with, is caught by, or steps on the obstacle and the vehicle is stuck. The vehicle body bottom is likely to contact with an obstacle particularly at a portion between the front wheels and the rear wheels.

The present invention has been made in view of the problem mentioned above, and an object thereof is to provide a utility vehicle having further improved traveling performance on an uneven ground.

In order to achieve the object mentioned above, the present invention provides a utility vehicle including a vehicle body frame; a pair of right and left front wheels disposed at a front end of the vehicle body frame and a pair of right and left rear wheels disposed at a rear end of the vehicle body frame. The vehicle body frame has, at a bottom thereof, a bottom main frame extending in an anteroposterior direction at a center of the vehicle in a vehicle width direction, and a pair of right and left bottom side frames extending in the anteroposterior direction between the front wheels and the rear wheels at outer ends of the vehicle in the vehicle width direction, and the bottom side frames are located above the bottom main frame.

According to the present invention, the bottom side frames are located at the higher ground level than the bottom main frame, to inhibit contact with an obstacle run over by the front wheel or the rear wheel while the utility vehicle is travelling forward or backward. This improves traveling performance of the utility vehicle. This configuration also inhibits reduction in riding space in comparison to a case where the entire vehicle body bottom has a higher ground level.

The utility vehicle preferably has any of the following configurations.

(1) The front wheels and the rear wheels are swingably supported vertically relative to the vehicle body frame, and the bottom side frames are located higher than rotation axes of the front wheels and the rear wheels and lower than upper ends of the front wheels and the rear wheels, when these wheels are not swinging vertically.

According to the configuration (1), the bottom side frames are located above the rotation axes of the front wheels and the rear wheels in the state of not swinging vertically (hereinafter, referred to as a 1 G state) to further inhibit contact with an obstacle. The bottom side frames are vertically located below the upper ends of the front wheels and the rear wheels to be inhibited from being vertically located too high. This configuration inhibits deterioration in boarding property into the riding space.

(2) The utility vehicle further includes a slanted face extending in a downwardly slanting direction from one of the bottom side frames toward a center in the vehicle width direction and connected directly or indirectly to an outer end in the vehicle width direction of the bottom main frame.

According to the configuration (2), the slanted face smoothly connects the bottom side frame to the bottom main frame. Catch of an obstacle is thus likely to be inhibited at the portions between the bottom side frames and the bottom main frame. Even when an obstacle comes into contact with the slanted face, the slanted face is likely to guide the obstacle outward in the vehicle width direction to further inhibit the catch.

(3) The utility vehicle has the configuration (2), and the slanted face has an inner end in the vehicle width direction located inside the front wheel and the rear wheel.

According to the configuration (3), the slanted face is provided correspondingly to at least the width of the front wheels and the rear wheels. This configuration preferably inhibits catch of an obstacle run over by the front wheel.

(4) The utility vehicle has the configuration (2), and the slanted face extends straight.

The configuration (4) achieves easy provision of the slanted face.

DETAILED DESCRIPTION OF THE INVENTION

A utility vehicle according to an embodiment of the present invention will now be described with reference to the accompanying drawings. For easier description, assume that the utility vehicle travels "forward" with respect to the utility vehicle and respective components, and right and left sides in the vehicle width direction of a crew correspond to "right and left sides" of the utility vehicle and the respective components.

Figure 1:
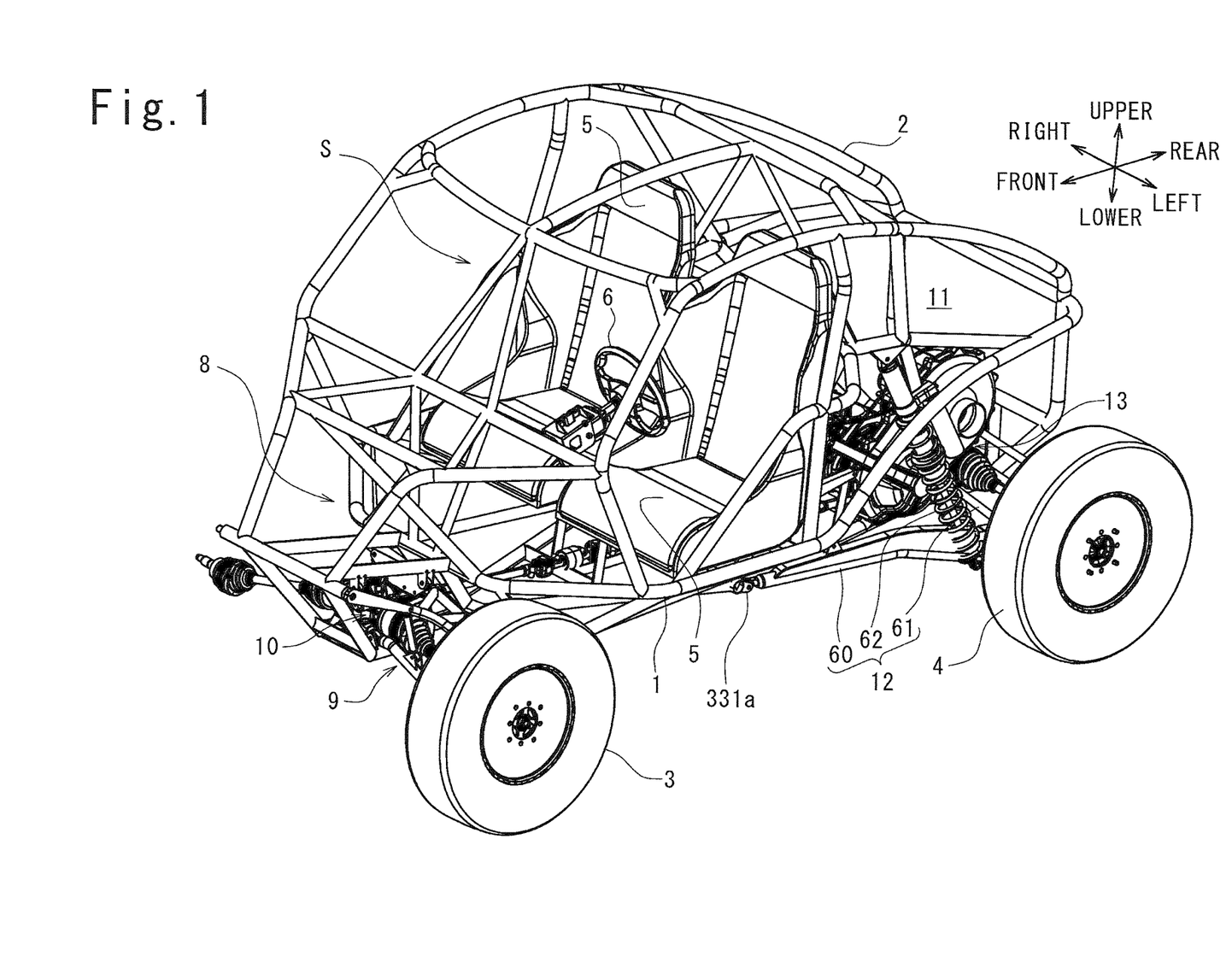
FIG. 1 is a perspective view from ahead, of a utility vehicle according to an embodiment of the present invention, in which no outline member is depicted.

FIG. 1 is a perspective view from ahead, of a utility vehicle according to an embodiment of the present invention, in which no outline member is depicted and the utility vehicle is depicted in a skeletal manner. FIG. 1 does not either depict a right front wheel, a right rear wheel and a suspension device vertically swingably supporting the right front and rear wheels. As depicted in FIG. 1, the utility vehicle has a skeleton including a vehicle body frame 1 extending in the anteroposterior direction and a ROPS 2 surrounding the top of a riding space S. The ROPS is an abbreviation for a rollover protective structure.

The vehicle body frame 1 supports a pair of right and left front wheels 3 disposed at the front end of the utility vehicle, and a pair of right and left rear wheels 4 disposed at the rear end of the utility vehicle. The riding space S is located between the pair of right and left front wheels 3 and the pair of right and left rear wheels 4. The riding space S accommodates a pair of right and left independent seats 5 and a steering wheel 6 disposed ahead of the seats 5.

The riding space S is provided thereahead with a bonnet chamber 8 surrounded with the pair of right and left front wheels 3 and a bonnet (not depicted). The bonnet chamber 8 accommodates front wheel suspension devices 9 vertically swingably supporting the front wheels 3 and a front wheel gear box 10 configured to transmit driving power to the right and left front wheels 3. FIG. 1 does not depict a shock absorber in each of the front wheel suspension device 9.

The riding space S is provided therebehind with an engine room 11 disposed between the pair of right and left rear wheels 4. The engine room 11 accommodates a pair of right and left rear wheel suspension devices 12 vertically swingably supporting the pair of right and left rear wheels 4, and a rear wheel gear box 13 configured to transmit driving power to the right and left rear wheels 4. The rear wheel suspension devices 12 each include a trailing arm 60 that has a front end pivot supported by a pivot support 331*a* of the vehicle body frame 1 and extends backward, a plurality of toe control arms 61 extending in the vehicle width direction, and a shock absorber 62 elastically coupling the trailing arm 60 to the vehicle body frame 1. The trailing arm 60 freely rotatably supports the rear wheel 4 at a rear end thereof.

Figure 2:
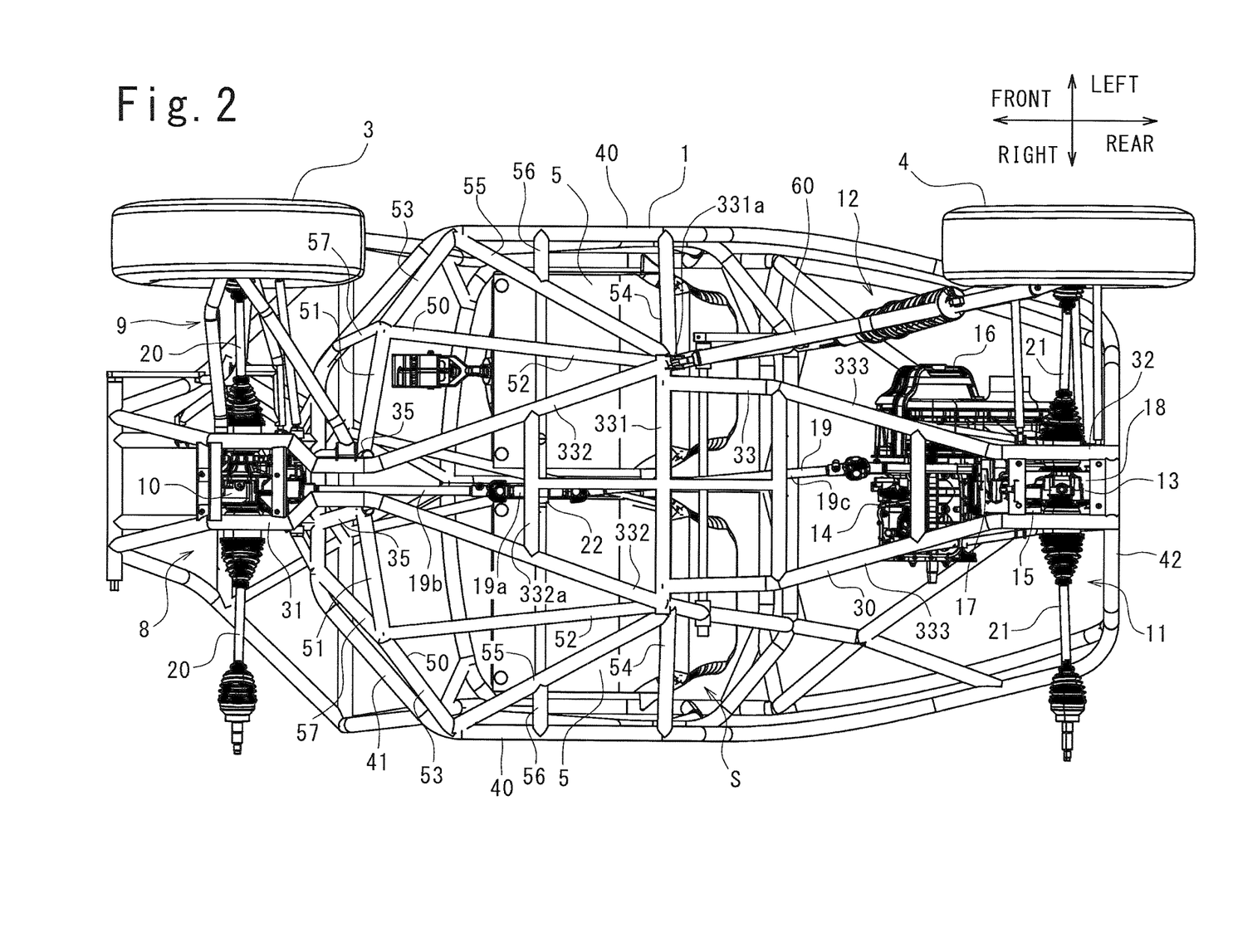
FIG. 2 is a bottom view of the utility vehicle depicted in FIG. 1.

FIG. 2 is a bottom view from below, of the utility vehicle depicted in FIG. 1. As depicted in FIG. 2, the engine room 11 accommodates an engine 14, a transmission 15 located behind the engine 14, and a V-belt continuously variable transmission 16 disposed along left ends of the engine 14 and the transmission 15. Driving power outputted from the engine 14 is transmitted to the transmission 15 via the V-belt continuously variable transmission 16, and the transmission 15 outputs the received driving power to a front wheel output unit 17 and a rear wheel output unit 18.

The front wheel output unit 17 is located at a front portion of the transmission 15. The front wheel output unit 17 is coupled with a propeller shaft 19 extending forward so as to transmit motive power. Driving power is transmitted from the front wheel output unit 17 to the front wheel gear box 10 via the propeller shaft 19. The rear wheel output unit 18 is located at a rear portion of the transmission 15. The rear wheel output unit 18 is provided with the rear wheel gear box 13.

The front wheel gear box 10 and the rear wheel gear box 13 distribute driving power to the right and left front wheels 3 and the right and left rear wheels 4. The front wheel gear box 10 is coupled with a pair of right and left front wheel drive shafts 20. Driving power transmitted from the propeller shaft 19 is distributed to the right and left front wheels 3 via the front wheel drive shafts 20. The rear wheel gear box 13 is similarly coupled with a pair of right and left rear wheel drive shafts 21. Driving power transmitted to the rear wheel output unit 18 is distributed to the right and left rear wheels 4 via the rear wheel drive shafts 21.

The propeller shaft 19 is divided into front and rear portions, namely, a front propeller shaft 19*b* and a rear propeller shaft 19*c*, which are located ahead of and behind an intermediate propeller shaft 19*a* supported by a bearing 22 that is located below the seats 5. The propeller shafts 19*a* to 19*c* are coupled together via universal joints.

Figure 3:
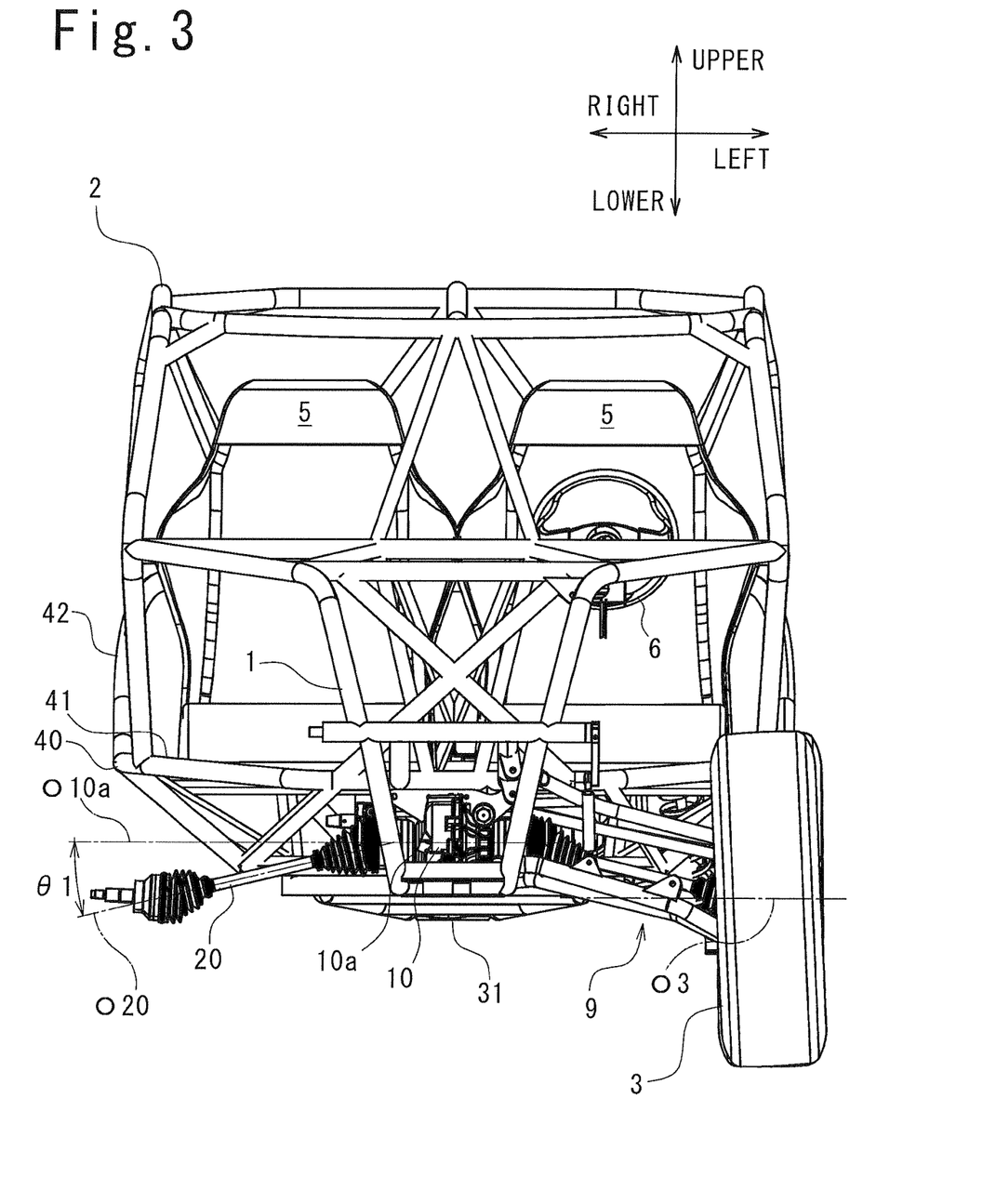
FIG. 3 is a front view of the utility vehicle depicted in FIG. 1.

FIG. 3 is a front view of the utility vehicle depicted in FIG. 1. As depicted in FIG. 3, the front wheel gear box 10 has an output unit 10*a* coupled with the front wheel drive shafts 20. The output unit 10*a* has an axis O10*a* located at a height level allowing a bend angle θ1 relative to an axis O20 of the front wheel drive shaft 20 to be within a predetermined angle range even in a case where the front wheel 3 swings vertically. In the front wheel gear box 10 according to the present embodiment, the axis O10*a* is located above an axle O3 of the front wheel 3 in a 1 G state.

In the 1 G state, the front wheel suspension devices 9 and the rear wheel suspension devices 12 are contracted by vehicle weight and the vehicle body frame 1 is located at a ground level according to the vehicle weight. In other words, the front wheels 3 and the rear wheels 4 in the 1 G state are not swung vertically relatively to the vehicle body frame 1 located at a predetermined ground level due to the vehicle weight.

Figure 4:
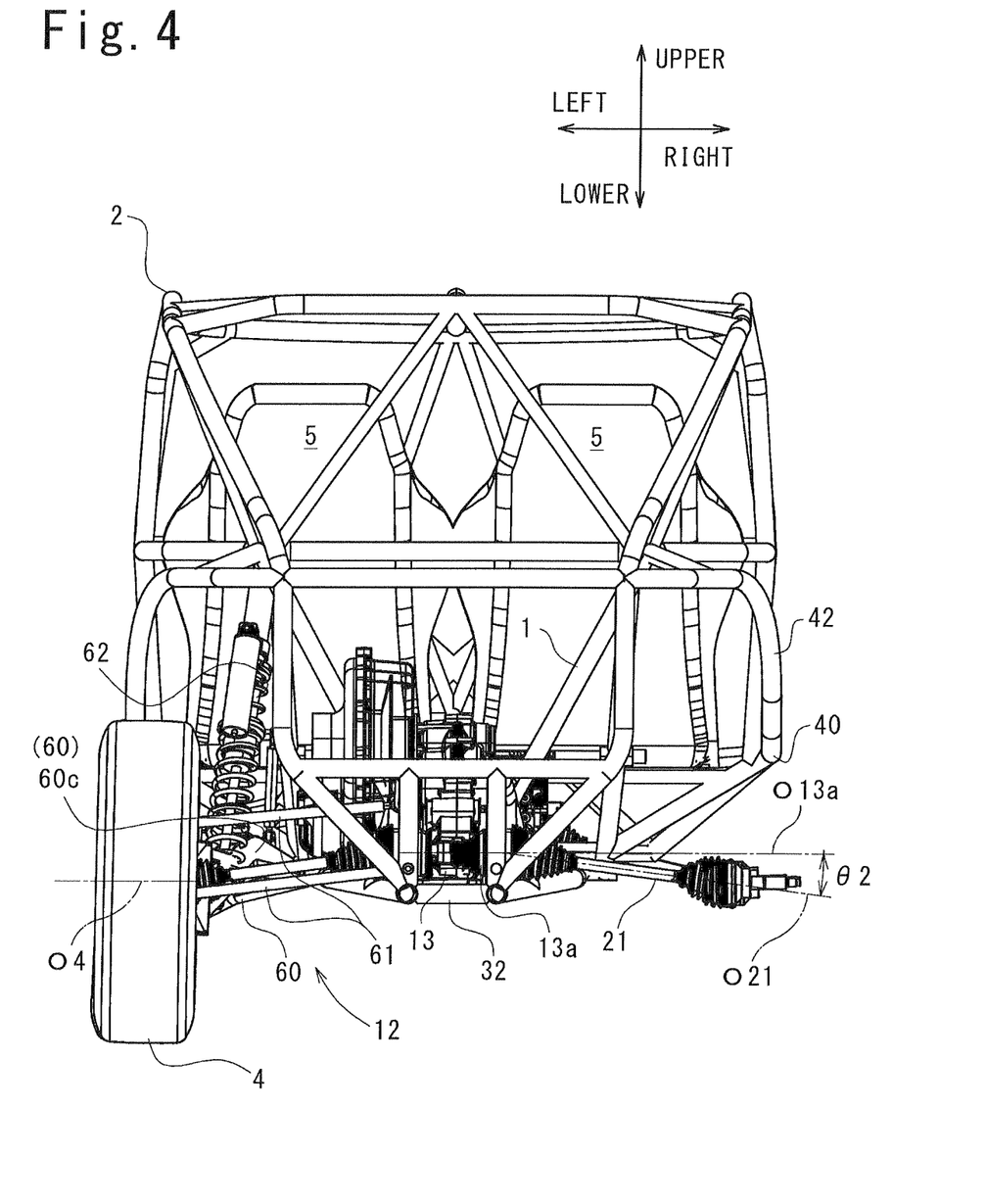
FIG. 4 is a rear view of the utility vehicle depicted in FIG. 1.

FIG. 4 is a rear view of the utility vehicle depicted in FIG. 1. As depicted in FIG. 4, the rear wheel gear box 13 has an output unit 13*a* coupled with the rear wheel drive shafts 21. The output unit 13*a* has an axis O13*a* located at a height level allowing a bend angle θ2 relative to an axis O21 of the rear wheel drive shaft 21 to be within a predetermined angle range even in a case where the rear wheel 4 swings vertically. In the rear wheel gear box 13 according to the present embodiment, the axis O13*a* is located above an axle O4 of the rear wheel 4 in the 1 G state.

The bottom of the vehicle body frame 1 will be described below.

As depicted in FIG. 2, the vehicle body frame 1 is provided at the bottom with a bottom main frame 30 that is located substantially in the center in the vehicle width direction and extends substantially horizontally in the anteroposterior direction, a pair of right and left bottom side frames 40 that is located at outer ends in the vehicle width direction and extends between the front wheels 3 and the rear wheels 4 in the anteroposterior direction, and a pair of right and left coupling frames 50 that couple the bottom main frame 30 to the pair of right and left bottom side frames 40.

The vehicle body frame 1 further includes a bottom front frame 41 that is connected to front portions of the bottom side frames 40 and is located at a rear portion of the riding space S, and a bottom rear frame 42 that is connected to rear portions of the bottom side frames 40 and is located around the engine room 11. The bottom front frame 41, in a bottom view, is formed in a U shape with a rear opening so as to surround the front end of the riding space S from ahead thereof. The bottom rear frame 42, in a bottom view, is formed in a U shape with a front opening so as to surround the rear end of the engine room 11.

The bottom main frame 30 is located between the pair of right and left front wheels 3 and between the pair of right and left rear wheels 4, in the vehicle width direction. The bottom main frame 30 includes a main frame front portion 31 located between the pair of right and left front wheels 3, a main frame rear portion 32 located between the pair of right and left rear wheels 4, and a main frame intermediate portion 33 located between the main frame front portion 31 and the main frame rear portion 32 and extending in the anteroposterior direction.

The main frame front portion 31 and the main frame rear portion 32 each have a rectangular shape in a bottom view. The main frame front portion 31 supports the front wheel gear box 10 from lower side thereof. The main frame rear portion 32 supports the rear wheel gear box 13 from lower side thereof.

The main frame intermediate portion 33 includes a cross member 331 located at a substantially intermediate position between the front wheels 3 and the rear wheels 4 in the anteroposterior direction and extending in the vehicle width direction, a pair of right and left anteroposterior front members 332 anteroposteriorly coupling the cross member 331 and the main frame front portion 31, and a pair of right and left anteroposterior rear members 333 anteroposteriorly coupling the cross member 331 and the main frame rear portion 32.

Specifically, in a bottom view, the cross member 331 is located behind the seats 5 and extends in the vehicle width direction from a substantial center of one of the seats 5 to a substantial center of the other one of the seats 5. The cross member 331 has opposite ends in the vehicle width direction, each of which has a front portion firmly fixed, by welding or the like, to corresponding one of the anteroposterior front members 332, and a rear portion firmly fixed, by welding or the like, to the pivot support 331a for the trailing arm 60 and corresponding one of the anteroposterior rear members 333 in the mentioned order from outside in the vehicle width direction.

Figure 5:
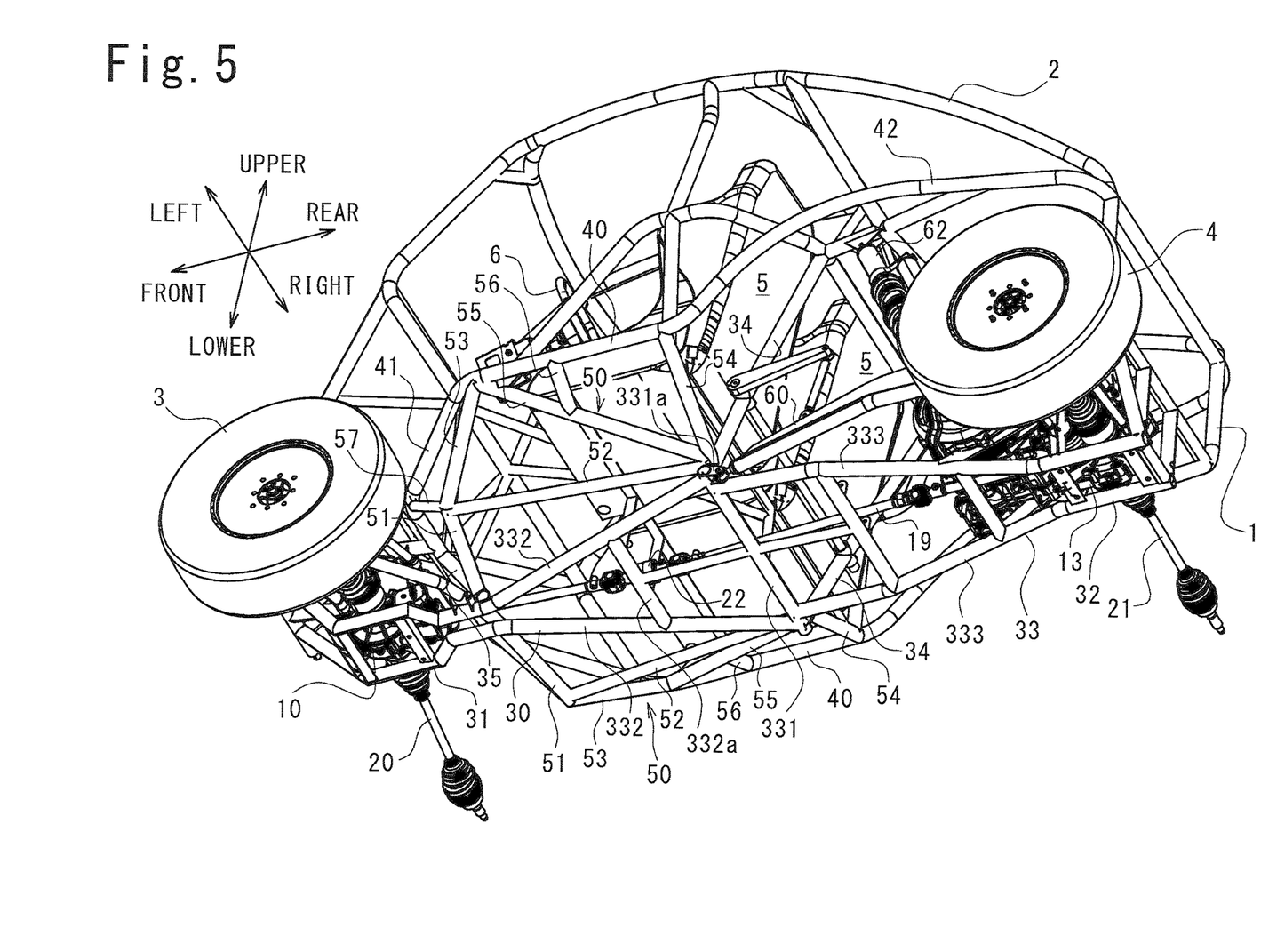
FIG. 5 is a perspective view from below, of the utility vehicle depicted in FIG. 1.

FIG. 5 is a perspective view from below, of the utility vehicle depicted in FIG. 1. As depicted in FIG. 5, the opposite ends in the vehicle width direction of the cross member 331 have upper portions firmly fixed, by welding or the like, to a pair of right and left vertical rear members 34. The vertical rear members 34 are slanted backward as extending behind the seats 5 toward the upper ends.

The anteroposterior front members 332 are slanted inward in the vehicle width direction from the opposite ends in the vehicle width direction of the cross member 331 toward the rear portion of the main frame front portion 31. In other words, the pair of right and left anteroposterior front members 332 has a distance therebetween in the vehicle width direction gradually reduced toward the front ends. The pair of right and left anteroposterior front members 332 is coupled to each other in the vehicle width direction by a front cross member 332a. The front cross member 332a is located substantially correspondingly to the front portions of the seats 5. The front cross member 332a supports the bearing 22 for the propeller shaft 19 from lower side thereof.

The right and left anteroposterior front members 332 have front portions coupled to the bottom front frame 41 by a pair of right and left vertical front members 35. The vertical front members 35 are slanted forward as extending upward.

Each of the anteroposterior rear members 333 is slanted inward in the vehicle width direction from the inner end in the vehicle width direction of the pivot support 331a of the cross member 331 toward the front portion of the main frame rear portion 32. In other words, the pair of right and left anteroposterior rear members 333 has a distance therebetween in the vehicle width direction gradually reduced toward the rear ends.

Figure 6:
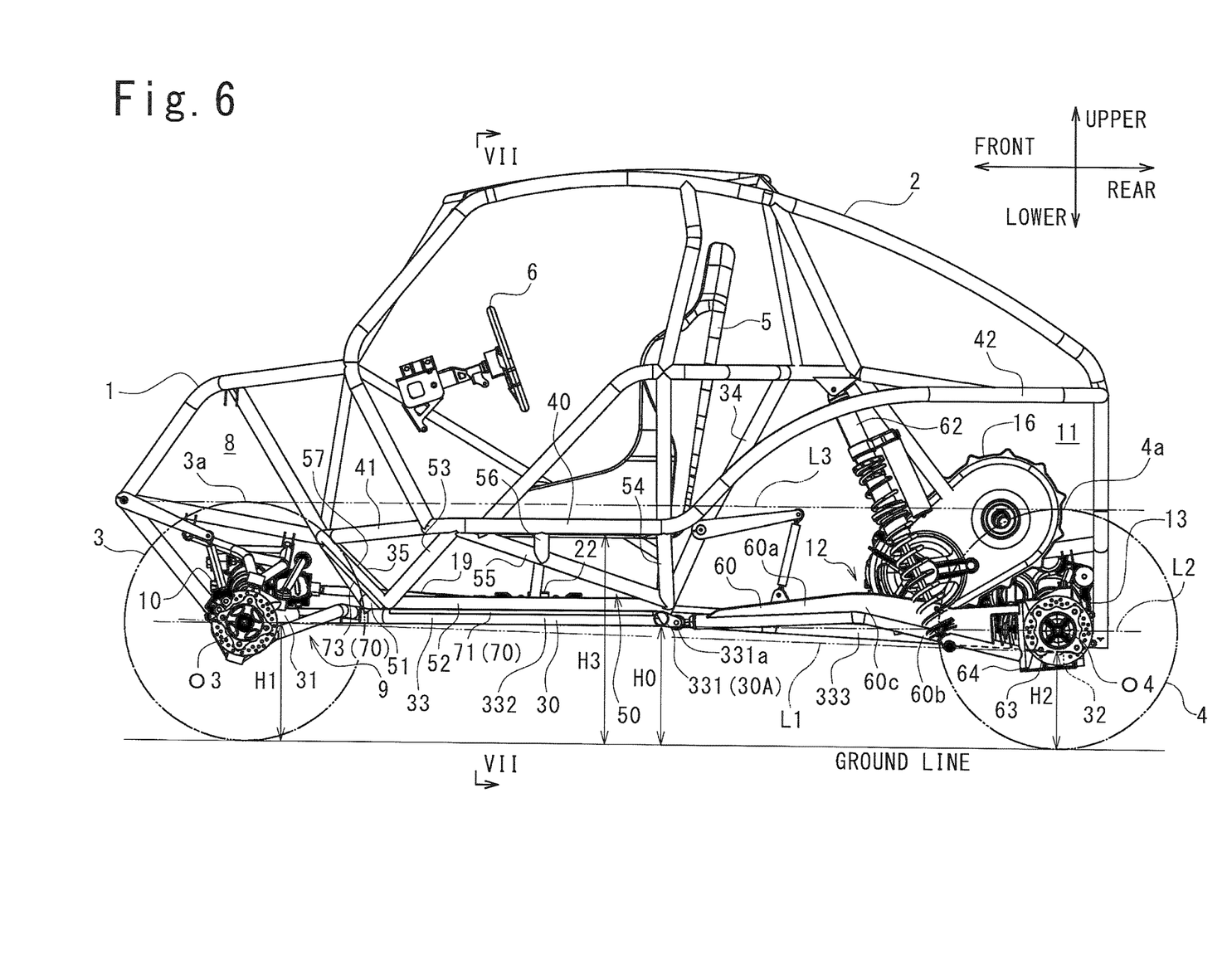
FIG. 6 is a left side view of the utility vehicle depicted in FIG. 1.

FIG. 6 is a left side view of the utility vehicle of FIG. 1 with the front wheel 3 and the rear wheel 4 depicted by two-dot chain lines in a transparent manner. As depicted in FIG. 6, the main frame intermediate portion 33 is located above a line L1 anteroposteriorly connecting the respectively lower ends of the main frame front portion 31 and the main frame rear portion 32. Specifically, the main frame intermediate portion 33 in a side view is bent to project upward so as to have a peak at the cross member 331. In other words, the main frame intermediate portion 33 has a ground level gradually increasing from the main frame front portion 31 and the main frame rear portion 32 toward the cross member 331.

In the bottom main frame 30, the cross member 331 of the main frame intermediate portion 33 has a higher ground level than the main frame front portion 31 and the main frame rear portion 32, as a main frame highest portion 30A having the highest ground level in the bottom main frame 30. Specifically, the main frame highest portion 30A has a higher level H0 above the ground than a level H1 above the ground of the main frame front portion 31 and a level H2 above the ground of the main frame rear portion 32.

The level H0 above the ground of the main frame highest portion 30A is set to be higher than the level H1 above the ground of the main frame front portion 31 and the level H2 above the ground of the main frame rear portion 32, by not less than one inch and not more than two inches.

The bottom side frames 40 are located outside the seats 5 in the vehicle width direction and extend in the anteroposterior direction near the lower ends of the seats 5. The bottom side frames 40 are located above the bottom main frame. Specifically, the bottom side frames 40 in a side view are located between a line L2 connecting the axles O3 and O4 of the front wheels 3 and the rear wheels 4 in the 1 G state and a line L3 connecting upper ends 3a and 4a of the front wheels 3 and the rear wheels 4. More specifically, the bottom side frames 40 are located more adjacent to the line L3 rather than the line L2 in a side view and have a higher level H3 above the ground than the level H0 above the ground of the main frame highest portion 30A.

The bottom front frame 41 is located substantially at an identical level with the bottom side frames 40. The bottom rear frame 42 extends while bending upward from the rear portions of the seats 5, and extends backward above the rear wheels 4. The bottom rear frame 42 has a ground level set so as not to contact with the rear wheels 4 swinging upward.

As depicted in FIG. 5, each of the coupling frames 50 includes first to seventh coupling members 51 to 57 extending linearly. The first coupling member 51 extends outward in the vehicle width direction from the lower end of the vertical front member 35. With reference also to FIG. 2, the first coupling member 51 is located outside the center of the seat 5 in the vehicle width direction. The second coupling member 52 extends forward from the lower end of the vertical rear member 34 and is connected to the outer end in the vehicle width direction of the first coupling member 51.

The third coupling member 53 is slanted upward from the outer end in the vehicle width direction of the first coupling member 51 toward the outer end in the vehicle width direction and is connected to the front end of the bottom side frame 40. The fourth coupling member 54 is slanted upward from the lower end of the vertical rear member 34 toward the outer end in the vehicle width direction and is connected to the rear end of the bottom side frame 40. The fifth coupling member 55 connects the lower end of the fourth coupling member 54 and the front end of the bottom side frame 40 and extends diagonally between the bottom side frame 40 and the fourth coupling member 54.

The sixth coupling member 56 connects a substantially intermediate portion in the anteroposterior direction of the bottom side frame 40 and the fifth coupling member 55 and is slanted upward toward the outer end in the vehicle width direction. The seventh coupling member 57 connects the outer end in the vehicle width direction of the first coupling member 51 and the bottom front frame 41 and is slanted upward toward the front end.

As depicted in FIG. 2, the first coupling member 51 in a bottom view is located inside the bottom side frame 40 in the vehicle width direction, more specifically, inside the front wheel 3 and the rear wheel 4 in the vehicle width direction. The second coupling member 52 is located behind the bottom front frame 41 and inside the front wheel 3 and the rear wheel 4 in the vehicle width direction.

Figure 7:
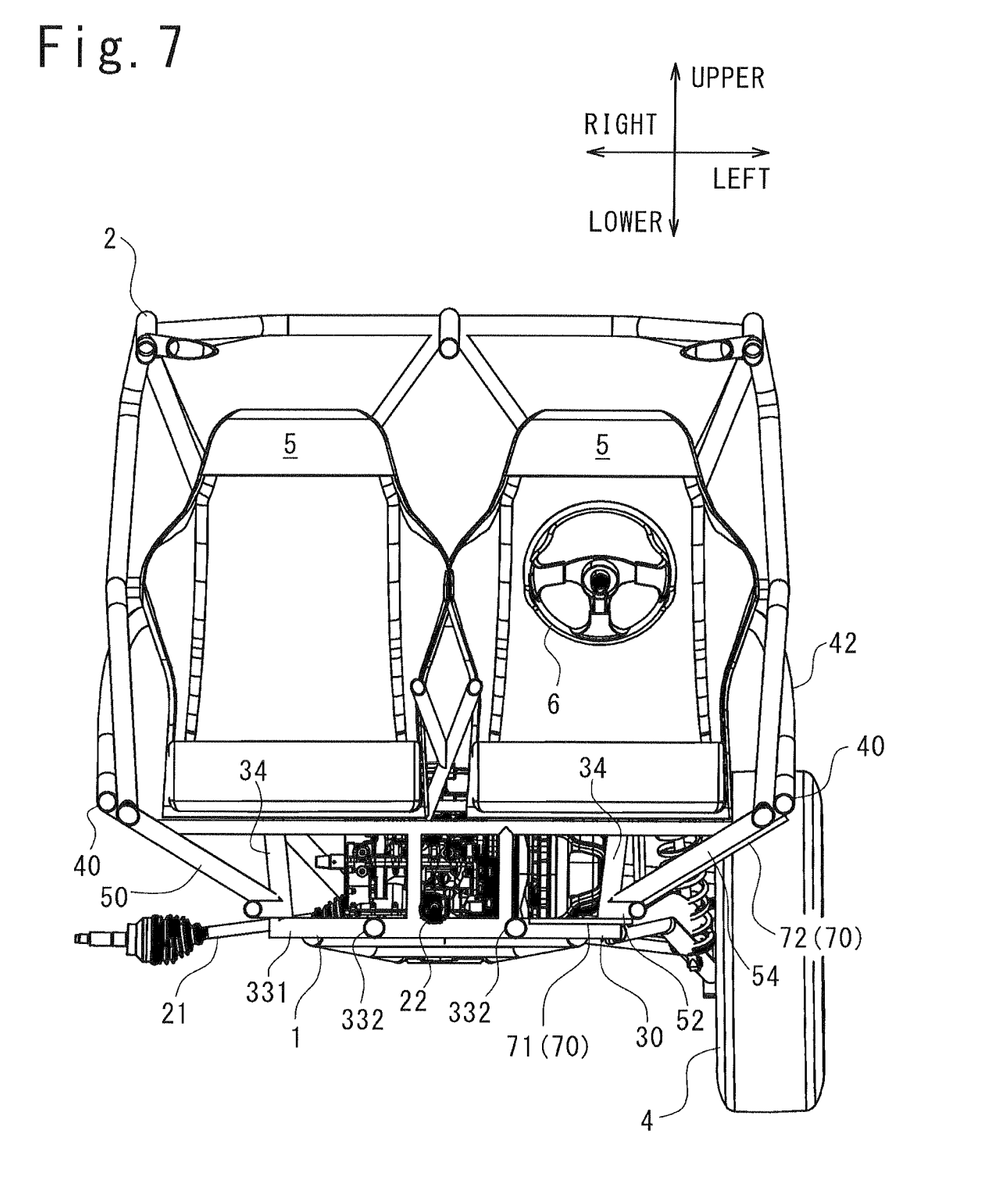
FIG. 7 is a sectional view taken along line VII-VII indicated in FIG. 6.

The bottom of the vehicle body frame 1 thus has a so-called ship bottom shape gradually reduced in size toward the lower end. As depicted in FIG. 6, the bottom of the vehicle body frame 1 has a front portion slanted downward toward the rear end. FIG. 7 is a longitudinal sectional view of the utility vehicle, taken along line VII-VII indicated in FIG. 6. As depicted in FIG. 7, the bottom of the vehicle body frame 1 is slanted downward toward the center in the vehicle width direction.

As depicted only in FIGS. 6 and 7, attached to the bottom of the vehicle body frame 1 is a bottom panel 70 covering the front end and the lower end of the bottom. The bottom panel 70 includes a bottom face 71 extending from the first coupling members 51 and the second coupling members 52 to the outer ends in the vehicle width direction of the bottom main frame 30 and attached to the lower ends thereof, lateral slanted faces 72 (see FIG. 7) each extending between the bottom side frame 40 and the second coupling member 52 and attached to the lower ends thereof, and a front slanted face 73 (see FIG. 6) extending between the bottom front frame 41 and the first coupling members 51 and attached to the lower ends thereof. The bottom face 71, the lateral slanted faces 72, and the front slanted face 73 are each provided as a flat plate.

The first coupling members 51 and the second coupling members 52 configuring the bottom in the coupling frames 50 extend substantially horizontally from the lower ends of the vertical front members 35 and the vertical rear members 34. The bottom face 71 thus extends substantially horizontally at a higher level than the bottom main frame 30. The bottom face 71 defines an area around feet in the riding space S. As depicted in FIG. 2, the second coupling member 52 is slanted outward in the vehicle width direction toward the front end. The bottom face 71 thus expands in the vehicle width direction toward the front end. The riding space S has the area around feet expanded particularly in the front portion.

As depicted in FIG. 7, the lateral slanted faces 72 each extend linearly in a downwardly slanting direction toward the center in the vehicle width direction. The first coupling members 51 are located inside the front wheels 3 and the rear wheels 4 in the vehicle width direction, so that the lateral slanted faces 72 are located correspondingly to at least the front wheels 3 and the rear wheels 4 in the vehicle width direction and have inner ends located inside the front wheels 3 and the rear wheels 4 in the vehicle width direction. As depicted in FIG. 6, the front slanted face 73 extends linearly in a downwardly slanting direction toward the rear end. The lateral slanted faces 72 and the front slanted face 73 have the lower ends connected to the outer ends in the vehicle width direction of the bottom main frame 30 via the bottom face 71.

The trailing arm 60 will be described next. As depicted in FIG. 6, the trailing arm 60 is bent to project upward in the 1 G state and extends from the pivot support 331a of the bottom main frame 30 to a knuckle 64 rotatably supporting the rear wheel 4 with a hub 63. The trailing arm 60 has a portion that is located ahead of the rear wheel 4 and substantially above the lower face of the anteroposterior rear member 333.

Specifically, the trailing arm 60 includes a trailing arm front half 60a, a trailing arm rear half 60b, and a trailing arm bent portion 60c between the trailing arm front half 60a and the trailing arm rear half 60b. The trailing arm front half 60a extends in a gently upwardly slanting direction from the pivot support 331a toward the trailing arm bent portion 60c. The trailing arm rear half 60b extends in a gently downwardly slanting direction from the trailing arm bent portion 60c toward a rear end thereof.

The trailing arm bent portion 60c is bent so as to project upward ahead of the rear wheel 4 and above the lower face of the anteroposterior rear member 333.

The utility vehicle thus configured achieves the following effects.

The bottom side frames 40 are located at a higher ground level than the bottom main frame 30, to inhibit contact with an obstacle run over by the front wheel 3 or the rear wheel 4 while the utility vehicle is travelling forward or backward. This improves traveling performance of the utility vehicle. This configuration also inhibits reduction in riding space S in comparison to a case where the entire vehicle body bottom has a higher ground level.

The bottom side frames 40 are located above the axles O3 and O4 of the front wheels 3 and the rear wheels 4 in the 1 G state to further inhibit contact with an obstacle. The bottom side frames 40 are vertically located below the upper ends 3a and 4a of the front wheels 3 and the rear wheels 4 to be inhibited from being located at a too high vertical position. This configuration inhibits deterioration in boarding property into the riding space S.

The lateral slanted faces 72 smoothly connect the bottom side frames 40 to the bottom main frame 30. Catch of an obstacle is thus likely to be inhibited at the portions between the bottom side frames 40 and the bottom main frame 30. Even when an obstacle contacts with the lateral slanted face 72, the lateral slanted face 72 is likely to guide the obstacle outward in the vehicle width direction to further inhibit the catch.

The lateral slanted faces 72 are provided correspondingly to at least the width of the front wheels 3 and the rear wheels 4. This configuration preferably inhibits catch of an obstacle run over by the front wheel 3 during forward travel or by the rear wheel 4 during backward travel.

The lateral slanted faces extend linearly and are thus formed easily.

The bottom main frame 30 has a ground level gradually increasing from the main frame front portion 31 and the main frame rear portion 32 toward the cross member 331. The vehicle body bottom is likely to contact with or be caught by an obstacle on a road surface at a position far away from the front wheels 3 and the rear wheels 4. However, in the bottom main frame 30, the cross member 331 located at a substantially intermediate position between the front wheels 3 and the rear wheels 4 in the anteroposterior direction has a ground level set to be particularly high. This configuration inhibits increase in ground level of the main frame front portion 31 and the main frame rear portion 32 as well as achieves a high ground level set smoothly at the main frame intermediate portion 33. Contact with an obstacle is thus likely to be inhibited and traveling performance of the utility vehicle on an uneven ground is improved.

Furthermore, increase in ground level of the main frame front portion 31 and the main frame rear portion 32 is inhibited so as to inhibit increase in ground level of the front wheel gear box 10 and the rear wheel gear box 13 supported by the main frame front portion 31 and the main frame rear portion 32. This inhibits increase of the bend angles θ1 and θ2 of the front wheel drive shaft 20 and the rear wheel drive shaft 21. The bend angles θ1 and θ2 of the drive shafts 20 and 21 are inhibited from increasing whereas the bottom main frame 30 has a high ground level set smoothly between the front wheels 3 and the rear wheels 4.

In the bottom main frame 30, the level H0 above the ground of the main frame highest portion 30A is set to be higher than the level H1 above the ground of the main frame front portion 31 and the level H2 above the ground of the main frame rear portion 32, by not less than one inch and not more than two inches. In the bottom main frame 30, the main frame highest portion 30A has a ground level set to be higher by at least one inch than the main frame front portion 31 and the main frame rear portion 32, to more preferably prevent contact with an obstacle on a road surface.

In the bottom main frame 30, the main frame highest portion 30A has a ground level set to be higher by at most two inches than the main frame front portion 31 and the main frame rear portion 32, to inhibit the bottom main frame 30 from excessively projecting upward and inhibit disposition of the bearing 22 excessively at a high level, for example. The propeller shaft 19 is thus inhibited from having an excessively increased bend angle ahead of and behind the intermediate propeller shaft 19a.

The trailing arm 60 is bent so as to project upward, which enables the trailing arm 60 to have a high ground level ahead of the rear wheel 4 and substantially above the lower face of the anteroposterior rear member 333. This configuration preferably prevents contact with or catch of an obstacle on a road surface with the trailing arm 60 while the utility vehicle is travelling on an uneven ground.

The lateral slanted faces 72 and the front slanted face 73 according to the embodiment described above are connected to the outer ends in the vehicle width direction of the bottom main frame 30 via the bottom face 71. The lateral slanted faces 72 and the front slanted face 73 are alternatively connected directly to the outer ends in the vehicle width direction of the bottom main frame 30 without via bottom face 71. The lateral slanted faces 72 and the front slanted face 73 are thus provided in wider ranges to achieve further prevention of contact with an obstacle on a road surface and further improvement in traveling performance on an uneven ground.

The first to seventh coupling members 51 to 57 according to the above embodiment are provided as linear pipe members. The present invention is not limited to this case and these coupling members are alternatively provided as curved pipe members. For example, the third to sixth coupling members 53 to 56 are alternatively curved to project outward in the vehicle width direction. In this case, the lateral slanted faces 72 are also curved to project outward in the vehicle width direction along the third to sixth coupling members 53 to 56. This configuration achieves increase in area around feet in the riding space S. The lower ends of the lateral slanted faces 72 and the bottom face 71 are joined more gently continuously to further prevent catch of an obstacle on a road surface to the bottom of the vehicle body frame 1.

The third to sixth coupling members 53 to 56 are still alternatively curved to project inward in the vehicle width direction (toward the riding space S). In this case, the lateral slanted faces 72 are also curved to project inward in the vehicle width direction along the third to sixth coupling members 53 to 56. This configuration is likely to allow particularly the lateral slanted faces 72 to be spaced apart from a road surface and is likely to further prevent catch of an obstacle on a road surface to the bottom of the vehicle body frame 1.

Respective members may be joined together to be firmly fixed by welding or joined detachably via a fastening member.

The present invention can be modified or changed in various manners without departing from the spirit and scope of the present invention recited in the following claims.

What is claimed is:

1. A utility vehicle comprising: a vehicle body frame; a pair of right and left front wheels disposed at a front end of the vehicle body frame; a pair of right and left rear wheels disposed at a rear end of the vehicle body frame; and a seat disposed in a riding space located between the pair of right and left front wheels and the pair of right and left rear wheels, wherein:
   the vehicle body frame has, at a bottom thereof,
   a bottom main frame extending in an anteroposterior direction at a center of the vehicle in a vehicle width direction,
   a pair of right and left bottom side frames extending in the anteroposterior direction between the front wheels and the rear wheels at outer ends of the vehicle in the vehicle width direction, and
   a bottom panel extending in a downwardly slanting direction from one of the bottom side frames toward a center in the vehicle width direction and being connected directly or indirectly to an outer end in the vehicle width direction of the bottom main frame, and covering from below between the one bottom side frame and the bottom main frame;
   the front wheels and the rear wheels are swingably supported vertically relative to the vehicle body frame;
   the bottom main frame has a portion that is located higher than a line anteroposteriorly connecting a lower end of a bottom main frame front portion and a lower end of a bottom main frame rear portion; and
   a whole of the bottom side frames are located above the bottom main frame and outside with respect to inner ends of the rear wheels in the vehicle width direction and each of the bottom side frames extends at the same height as a lower end of the seat in the anteroposterior direction.

2. The utility vehicle according to claim 1, wherein the bottom side frames are located higher than rotation axes of the front wheels and the rear wheels and lower than upper ends of the front wheels and the rear wheels, when these wheels are not swinging vertically.

3. The utility vehicle according to claim 2,
   wherein the bottom side frames are not lower than a vertically center position between the rotation axes of the front and the rear wheels and a line connecting both of the upper ends of the front and the rear wheels when these wheels are not swinging vertically.

4. The utility vehicle according to claim 2,
   wherein the bottom side frames are not lower than a vertically center position between the bottom main frame and a line connecting both of the upper ends of the front and the rear wheels when these wheels are not swinging vertically.

5. The utility vehicle according to claim 1, further comprising a pair of right and left coupling frames coupling the bottom main frame to the pair of right and left bottom side frames, wherein the bottom panel includes a slanted face extending between the bottom side frame and the coupling frame and attached to lower ends thereof, and the slanted face has an inner end in the vehicle width direction located inside the front wheel and the rear wheel.

6. The utility vehicle according to claim 5, wherein the slanted face extends straight.

7. The utility vehicle according to claim 1, further comprising a pair of right and left coupling frames coupling the bottom main frame to the pair of right and left bottom side frames, wherein the bottom panel includes a bottom face extending from the coupling frame to the outer ends in the vehicle width direction of the bottom main frame and attached to lower ends thereof, and the bottom face extends substantially horizontally at a higher level than the bottom main frame.

8. A utility vehicle comprising: a vehicle body frame; a pair of right and left front wheels disposed at a front end of the vehicle body frame; a pair of right and left rear wheels disposed at a rear end of the vehicle body frame; and a seat disposed in a riding space located between the pair of right and left front wheels and the pair of right and left rear wheels, wherein:

the vehicle body frame has, at a bottom thereof, a bottom main frame extending in an anteroposterior direction just under the seat at a center of the vehicle in a vehicle width direction, a pair of right and left bottom side frames extending in the anteroposterior direction between the front wheels and the rear wheels at outer ends of the vehicle in the vehicle width direction, and a pair of right and left coupling frames coupling the bottom main frame to the pair of right and left bottom side frames;

the front wheels and the rear wheels are swingably supported vertically relative to the vehicle body frame;

the bottom main frame has a portion that is located higher than a line anteroposteriorly connecting a lower end of a bottom main frame front portion and a lower end of a bottom main frame rear portion;

a whole of the bottom side frames are located above the bottom main frame and outside with respect to inner ends of the rear wheels in the vehicle width direction and each of the bottom side frames extends at the same height as a lower end of the seat in the anteroposterior direction; and the coupling frame is, in a bottom view, at least partially overlapped with the seat in the vehicle width direction.

9. The utility vehicle according to claim 8, wherein the bottom side frames are located higher than rotation axes of the front wheels and the rear wheels and lower than upper ends of the front wheels and the rear wheels, when these wheels are not swinging vertically.

10. The utility vehicle according to claim 9, wherein the bottom side frames are not lower than a vertically center position between the rotation axes of the front and the rear wheels and a line connecting both of the upper ends of the front and the rear wheels when these wheels are not swinging vertically.

11. The utility vehicle according to claim 9, wherein the bottom side frames are not lower than a vertically center position between the bottom main frame and a line connecting both of the upper ends of the front wheels and the rear wheels when these wheels are not swinging vertically.

12. The utility vehicle according to claim 8, further comprising a slanted face extending in a downwardly slanting direction from one of the bottom side frames toward a center in the vehicle width direction and connected directly or indirectly to an outer end in the vehicle width direction of the bottom main frame.

13. The utility vehicle according to claim 12, wherein the slanted face has an inner end in the vehicle width direction located inside the front wheel and the rear wheel.

14. The utility vehicle according to claim 12, wherein the slanted face extends straight.

15. The utility vehicle according to claim 8, further comprising a bottom panel extending in a downwardly slanting direction from one of the bottom side frames toward a center in the vehicle width direction and being connected directly or indirectly to an outer end in the vehicle width direction of the bottom main frame, and covering from below between the one bottom side frame and the bottom main frame, wherein the bottom panel includes a bottom face extending from the coupling frame to the outer ends in the vehicle width direction of the bottom main frame and attached to lower ends thereof, and the bottom face extends substantially horizontally at a higher level than the bottom main frame.

16. The utility vehicle according to claim 8, wherein the bottom main frame has an intermediate portion including a cross member extending in the vehicle width direction and located at an intermediate position between the front wheels and the rear wheels in the anteroposterior direction, wherein the cross member is located at a higher level above the ground than the bottom main frame front and rear portions.

17. The utility vehicle according to claim 16, wherein the intermediate portion increases in height, relative to the ground, from the bottom main frame rear portion and the bottom main frame front portion to the cross member.

18. A utility vehicle comprising: a vehicle body frame; a pair of right and left front wheels disposed at a front end of the vehicle body frame; a pair of right and left rear wheels disposed at a rear end of the vehicle body frame; and a seat disposed in a riding space located between the pair of right and left front wheels and the pair of right and left rear wheels, wherein:

the vehicle body frame has, at a bottom thereof, a bottom main frame extending in an anteroposterior direction at a center of the vehicle in a vehicle width direction, a pair of right and left bottom side frames extending in the anteroposterior direction between the front wheels and the rear wheels at outer ends of the vehicle in the vehicle width direction, and a bottom panel extending in a downwardly slanting direction from one of the bottom side frames toward a center in the vehicle width direction and being connected directly or indirectly to an outer end in the vehicle width direction of the bottom main frame, and covering from below between the one bottom side frame and the bottom main frame;

the front wheels and the rear wheels are swingably supported vertically relative to the vehicle body frame; and a whole of the bottom side frames are located above the bottom main frame and outside with respect to inner ends of the rear wheels in the vehicle width direction and each of the bottom side frames extends at the same height as a lower end of the seat in the anteroposterior direction.

\* \* \* \* \*